(12) United States Patent
Queck (10) Patent No.: US 9,003,506 B2
(45) Date of Patent: Apr. 7, 2015

(54) MOBILE OUT-OF-BAND AUTHENTICATION SERVICE

(75) Inventor: Tobias Queck, Mountain View, CA (US)

(73) Assignee: SAP SE, Walldorf (DE)

( * ) Notice: Subject to any disclaimer, the term of this patent is extended or adjusted under 35 U.S.C. 154(b) by 611 days.

(21) Appl. No.: 12/970,737

(22) Filed: Dec. 16, 2010

(65) Prior Publication Data

US 2012/0159603 A1 Jun. 21, 2012

(51) Int. Cl.
*H04L 29/06* (2006.01)
*H04L 9/32* (2006.01)

(52) U.S. Cl.
CPC .............. *H04L 9/3215* (2013.01); *H04L 63/08* (2013.01); *H04L 63/18* (2013.01); *H04L 2209/80* (2013.01)

(58) Field of Classification Search
CPC ................................. G06F 21/34; G06F 21/35
USPC .................. 726/5, 7, 27, 28, 9; 713/182, 185; 705/65, 67
See application file for complete search history.

(56) References Cited

U.S. PATENT DOCUMENTS

| | | | | |
|---|---|---|---|---|
| 8,256,664 | B1 * | 9/2012 | Balfanz et al. ................ | 235/375 |
| 2002/0004831 | A1 * | 1/2002 | Woodhill ...................... | 709/229 |
| 2007/0224971 | A1 * | 9/2007 | Jung et al. .................... | 455/411 |

OTHER PUBLICATIONS

"A more secure cloud for millions of Google Apps users", Official Google Enterprise Blog, (Sep. 20, 2010), 2 pgs.
"Basic access authentication", Wikipedia, [Online]. Retrieved from the Internet: <URL: http://en.wikipedia.org/wiki/Basic_access_authentication>, (Accessed Aug. 30, 2010), 5 pgs.
"One-time password", Wikipedia, [Online]. Retrieved from the Internet: <URL: http://en.wikipedia.org/wiki/One-time_password>, (Accessed Aug. 30, 2010), 7 pgs.
"The Authentication Revolution: Phones Become the Leading Multi-Factor Authentication Device", PhoneFactor, Inc. White Paper, (2010), 10 pgs.
Dierks, T., et al., "The TLS Protocol, Version 1.0", Network Working Group, The Internet Society, (Jan. 1999), 100 pgs.
Franks, J., et al., "HTTP Authentication: Basic and Digest Access Authentication", Network Working Group, The Internet Society, (Jun. 1999), 43 pgs.
Haller, N., et al., "A One-Time Password System", Network Working Group, The Internet Society, (Feb. 1998), 32 pgs.
Schneier, Bruce, "The Failure of Two-Factor Authentication", Schneier on Security: A blog covering security and security technology, (Mar. 15, 2005), 40 pgs.
Spera, Joann, "SSL client authentication: Its a matter of trust", IBM, [Online]. Retrieved from the Internet: <URL: http://www.ibm.com/developerworks/lotus/library/ls-SSL_client_authentication/>, (Mar. 2, 1998), 8 pgs.
Tsirulnik, Giselle, "RSA launches mobile authentication service", [Online]. Retrieved from the Internet: <URL: http://www.mobilemarketer.com/cms/news/messaging/1073.html>, (May 30, 2008), 2 pgs.

\* cited by examiner

*Primary Examiner* — Jeffrey Pwu
*Assistant Examiner* — Thong Truong
(74) *Attorney, Agent, or Firm* — Schwegman Lundberg & Woessner, P.A.

(57) ABSTRACT

Certain embodiments enable authentication of an application session at a client machine by using authentication values and user-identification values that are received from a mobile communication device. The mobile communication device provides an out-of-band channel for validating the session and enables secure authentication for a variety of applications.

19 Claims, 5 Drawing Sheets

MOBILE OUT-OF-BAND AUTHENTICATION SERVICE

BACKGROUND

1. Field

The present disclosure relates generally to computer applications and more particularly to authenticating a session of a computer application.

2. Related Art

Ideally a user session for a critical application will employ a secure authentication method that prevents identity theft. These security problems become increasingly important when sensitive enterprise applications are provided as on-demand cloud-computing services that allow user access at any time and from any computer. Some conventional methods enhance security by carrying out an authentication process via an out-of-band channel, that is, a second communication channel that is separate from the critical application. However, these methods typically rely on additional hardware (e.g., a security token) that may result in additional security risks such as loss or theft. Thus, there is a need for improved authentication methods that will enhance security for critical applications.

SUMMARY

Certain embodiments enable authentication of an application session at a client machine by using authentication values and user-identification values that are received from a mobile communication device. The mobile communication device provides an out-of-band channel for validating the session and enables secure authentication for a variety of applications.

One embodiment relates to a method of authenticating an application session at a client machine. This method includes receiving a request for the application session from the client machine; sending an authentication token to the client machine after receiving the request from the client machine; receiving values for the authentication token and values for user identification from a mobile communication device after sending the authentication token to the client machine, where the user-identification values correspond to the mobile communication device; and initiating the application session at the client machine after receiving the authentication-token values and the user-identification values.

Another embodiment relates to an apparatus for carrying out the above-described method, where the apparatus includes a computer for executing instructions related to the method. For example, the computer may include a processor for executing at least some of the instructions. Additionally or alternatively, the computer may include circuitry or other specialized hardware for executing at least some of the instructions. Another embodiment relates to a computer-readable medium that stores (e.g., tangibly embodies) a computer program for carrying out the above-described method with a computer. In these ways, aspects of the disclosed embodiments enable improved authentication methods to enhance security for a variety of applications.

DETAILED DESCRIPTION OF EXAMPLE EMBODIMENTS

Introduction

Conventional authentication methods have been developed to support a range of security levels for accessing application services. In the context of a Hypertext Transfer Protocol (HTTP) transaction, the most basic authentication methods employ a web browser, or other client program, to provide credentials (e.g., a user name and password) when making a request. (J. Franks et al., "HTTP Authentication: Basic and Digest Access Authentication," RFC 2617, Network Working Group, June 1999.) This level of security can be compromised by an eavesdropping mechanism (e.g., keyboard sniffer).

Certificate based authentication enables the authentication of users who access a server by exchanging a client certificate that is guaranteed by either an external Certification Authority, such as VeriSign, or by a server internal Certification Authority. The presence of the client certificate on the client machine or a separated storage device becomes an assurance that the person represented by the certificate is the person making the request. (T Dierks et al., "The TLS Protocol," RFC 2246, Network Working Group, January 1999.) However, access to the client certificate is frequently controlled by a password that is vulnerable to eavesdropping mechanisms.

A one-time password (OTP) is a password that is only valid for a single login session or transaction. OTPs avoid a number of shortcomings that are associated with traditional (static) passwords. The most important shortcoming addressed by OTPs is that, in contrast to static passwords, they are not vulnerable to replay attacks. This means that if a potential intruder manages to record an OTP that was already used to log into a service or to conduct a transaction, he will not be able to abuse it since it will be no longer valid. (N. Haller et al., "A One-Time Password System," RFC 2289, Network Working Group, February 1998; G. Tsirulnik, "RSA launches mobile authentication service," *Mobile Marketer, May* 30, 2008.) However, OTPs typically require additional hardware (e.g., a security token), and so this implementation presents additional challenges.

Method Embodiment

Figure 1:
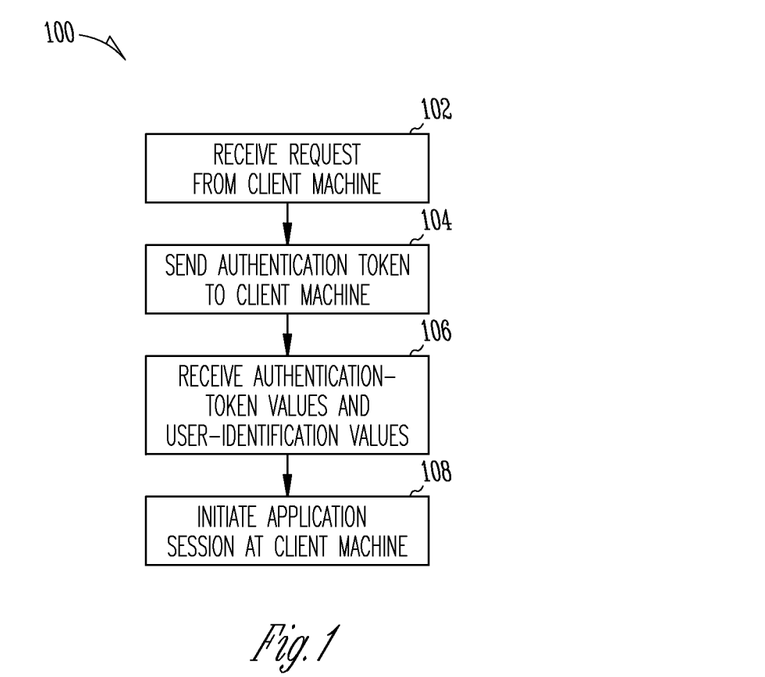
FIG. 1 is a flowchart that shows a method of authenticating an application session at a client machine according to an example embodiment.
Figure 2:
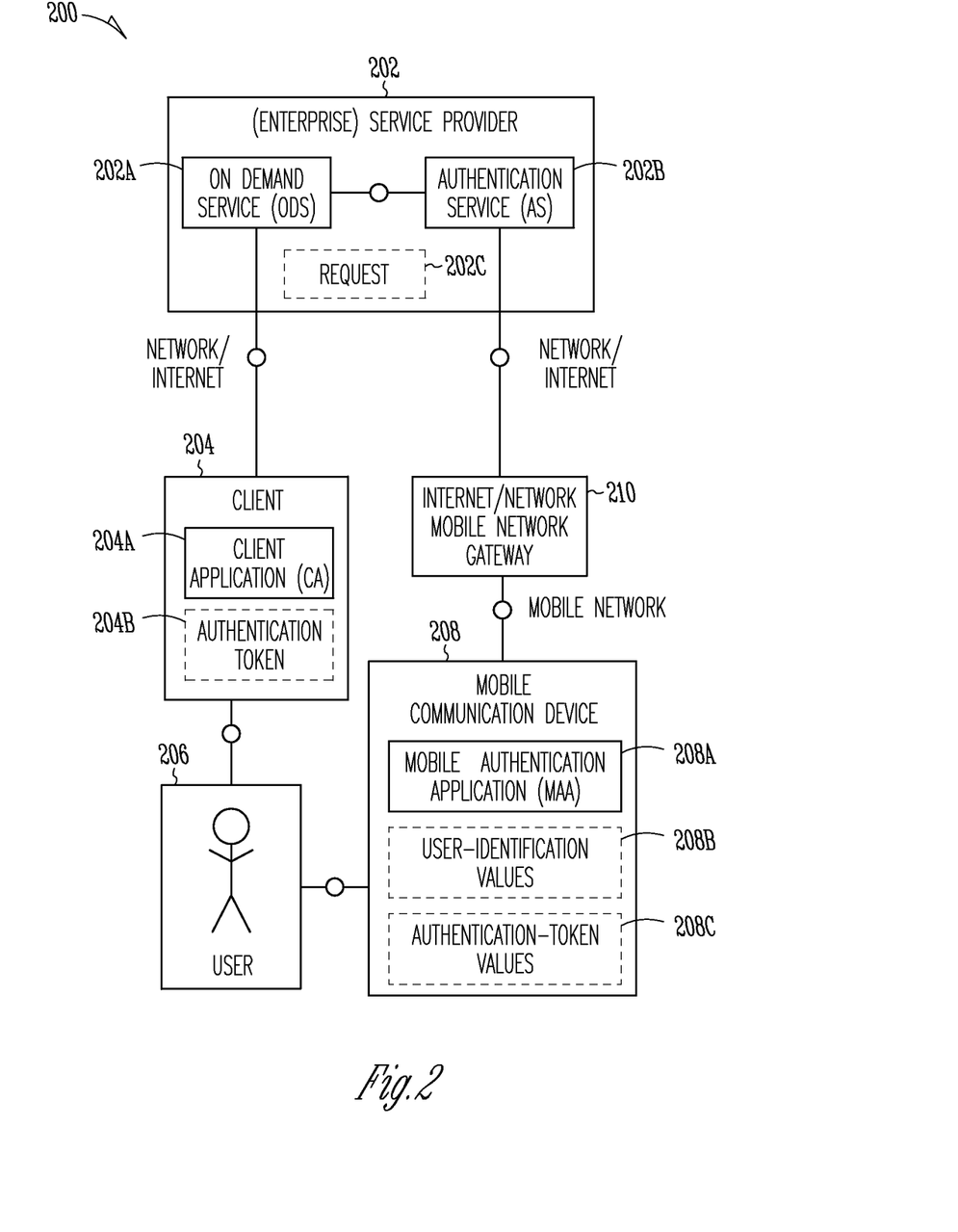
FIG. 2 is a schematic representation of a system that illustrates the method of FIG. 1.

FIG. 1 shows a flowchart that illustrates a method 100 of authenticating an application session at a client machine according to an example embodiment, and FIG. 2 shows a schematic representation of a system 200 where the method 100 is illustrated. In a first operation 102, a request 202C for the application session is received at a service provider machine 202 (e.g., server computer) from the client machine 204 (e.g., client computer). The request 202C, which can be made from a client application (CA) 204A executing at the client machine 204, may simply be the identification of a desired application service in a browser (e.g., INTERNET EXPLORER). However, in some cases it may be desirable to include a user name for a related user account either with or without a password for that account. In this example, the service provider machine 202 includes an on-demand service (ODS) module 202A that provides client services and an authentication service (AS) module 202B that provides verification services.

In a second operation 104, an authentication token 204B is sent from the service provider machine 202 to the client machine 204 after receiving the request from the client machine 204. The authentication token 204B can include a variety of data types that are suitable for secure identification and for transfer in some mode by a user 206 from the client machine 204 to a mobile communication device (e.g., cell phone) 208. Typical data types include a text element that can be viewed at the client machine 204 and entered via a keypad at device 208, an audio file that can be played through a speaker at the client machine 204 and captured by a microphone at the device 208, and an image file that can be displayed at the client machine 204 and captured by a camera at the device 208. For example, the text element may be a character-encoded string such as "CODE123." The audio file may be a sequence of several tones formatted as a Waveform Audio File (WAV). The image file may represent a matrix barcode or two-dimensional code formatted as a Joint Photographic Experts Group (JPEG) file or Portable Document Format (PDF) file. Thus, whatever the capture or input mode employed by the user 206, authentication-token values 208C characterize the authentication token 204B at the mobile device 208.

In this example, the mobile device 208 includes a mobile authentication application (MAA) 208A that communicates with the service provider AS 202B, possibly through a network gateway 210 that mediates between the networks of the mobile communication device 208 and the service provider machine 202 (e.g., mobile network and the Internet). The mobile device 208 also includes user-identification (ID) values 208B that typically identify the user 206 or at least someone authorized by the user 206. For example, the user-ID values 208B may be stored on the device 208 in a file including, for example, name and mobile phone number or other identifying characteristics. Alternatively, the user-ID values 208B may be an identifier of the registered user of the device 208 (e.g., at the network provider of the mobile device). For example, the mobile phone number alone as reflected by the transmission source of the communication may be used to identify the registered user. Alternatively, the user-ID values 208B may correspond to data originating from an input mode of device 208 including, for example, biometric data such a scanned fingerprint. Of course, using an input mode of the device 208 raises additional security concerns if the device 208 is lost or stolen, in which case greater reliance is being placed on access security for the device 208 (e.g., password protection).

In a third operation 106 the authentication-token values 208C and the user-ID values 208B are received at the service provider machine 202 from the mobile device 208. The AS module 202B communicates with the ODS module 202A to verify the authentication-token values 208C relative to the authentication token 204B and to verify the user-ID values 208B relative to the access requirements of the application service (e.g., a valid account for the identified user). In some cases, the user-ID values 208B may be verified for consistency with the original request 202C from the client machine 204.

In the case where there is an error in verifying the authentication-token values 208C or the user-ID values 208B, the session can be terminated (e.g., with an error message displayed in a window of the CA 204A). Otherwise, the session can be initiated according to the original request. Thus, in a fourth operation 108 after receiving the authentication-token values 208C and the user-ID values 208B, the session for the CA 204A at the client machine 204 is initiated by the ODS module 202A of the service provider machine 202 (e.g., for a user account identified by the user-ID values 208B). As illustrated by this example embodiment, secure login information (e.g., authentication-token values 208C, user-ID values 208B) can be sent entirely on a second out-of-band channel relative to the application service channel, a feature that is particularly desirable if the client machine 204 is a public access computer.

Additional embodiments relate to an apparatus for carrying out the above-described method 100, where the apparatus includes a computer for executing computer instructions related to the method 100. In this context the computer may be a general-purpose computer including, for example, a processor, memory, storage, and input/output devices (e.g., keyboard, display, disk drive, Internet connection, etc.). However, the computer may include circuitry or other specialized hardware for carrying out some or all aspects of the method. In some operational settings, the apparatus or computer may be configured as a system that includes one or more units, each of which is configured to carry out some aspects of the method either in software, in hardware or in some combination thereof. For example, the system may be configured as part of a computer network that includes the Internet. At least some values for the results of the method can be saved for later use in a computer-readable medium, including memory units (e.g., RAM (Random Access Memory), ROM (Read Only Memory)) and storage devices (e.g., hard-disk systems, optical storage systems).

Additional embodiments also relate to a computer-readable medium that stores (e.g., tangibly embodies) a computer program for carrying out the above-described method 100 by means of a computer. The computer program may be written, for example, in a general-purpose programming language (e.g., C, C++) or some specialized application-specific language. The computer program may be stored as an encoded file in some useful format (e.g., binary, American Standard Code for Information Interchange (ASCII)). In some contexts, the computer-readable medium may be alternatively described as a computer-useable medium, a computer-storage medium, a computer-program medium, machine-readable medium or some alternative non-transitory storage medium. Depending on the on the operational setting, specified values for the above-described method may correspond to input files for the computer program or computer.

System Embodiment

Figure 3:
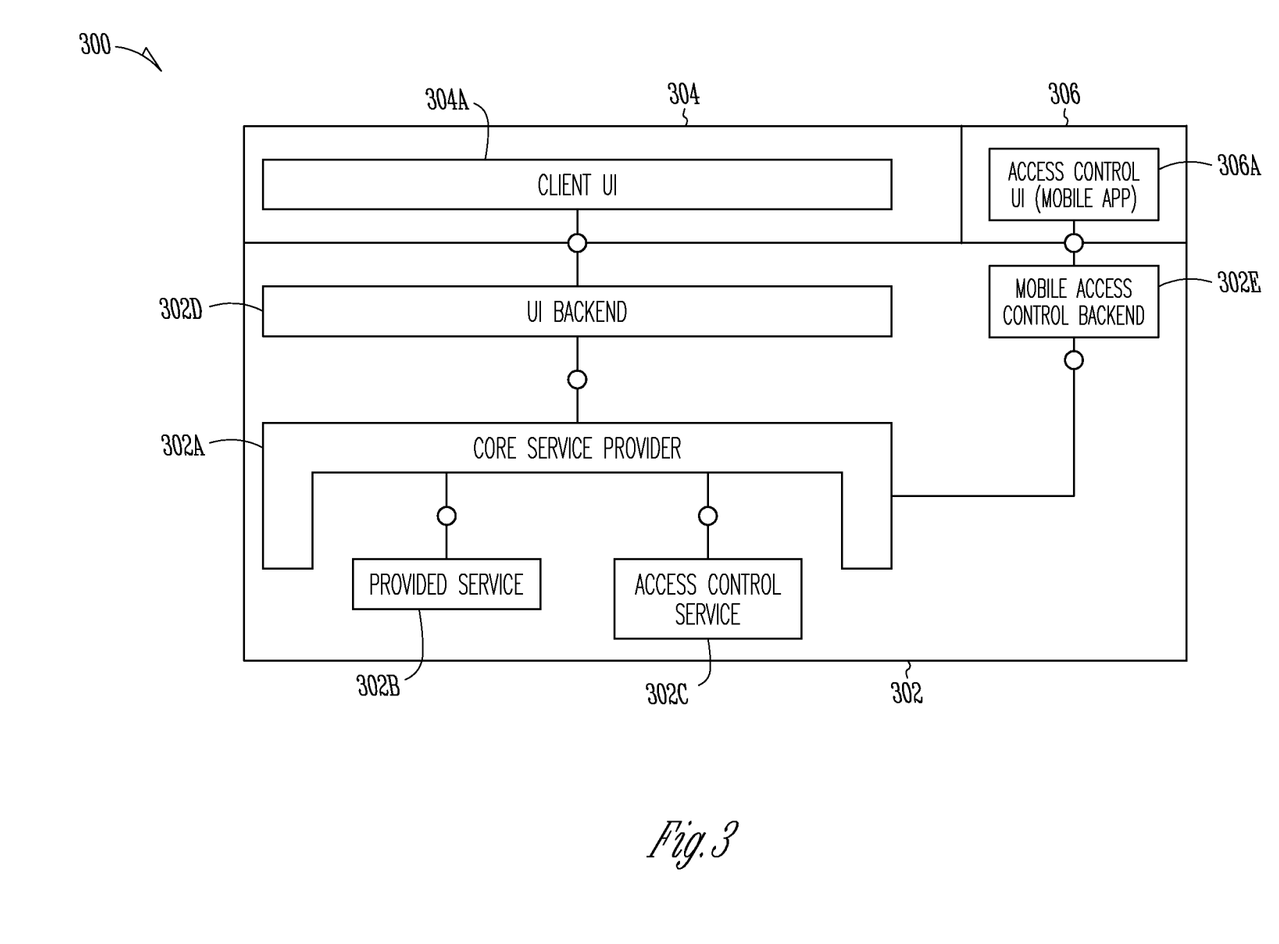
FIG. 3 is a schematic representation of a system in accordance with an example embodiment.

FIG. 3 shows a schematic representation of a system 300 that relates to the above-described method 100. The system 300 includes a service provider 302, a client 304 and a mobile device 306. The service provider 302 includes a core service provider module 302A that manages interactions with the client 304 through a user interface (UI) backend 302D and manages interactions with the mobile device 306 through a mobile access control backend 302E. The core service provider 302A also connects to a module 302B that executes the provided service (e.g., runs the application) and a module 302C that provides an access control service (e.g., by verifying the relevant values for authentication and user identification). The client 304 includes a client UI 304A that interacts with the UI backend 302D, and the mobile device 306 includes an access control UI 306A that interacts with the mobile access control backend 302E.

In operation, the client UI 304A is first started by a user. Next the client UI 304A requests a login view for an application service from UI Backend 302D. In response to this request, UI Backend 302D generates a login view that includes a unique ID that will act as an authentication token and forwards this login view to the client UI 304A. Next, when the client UI 304A sends a request for an initial screen to the UI Backend 302D, the UI Backend 302D forwards the unique ID to the core service provider 302A, which then forwards the unique ID to the access control service 302C. The user, who has access also to the mobile device 306, enters the unique ID into the access control UI 306A, which then forwards the unique ID to the mobile access control backend 302E. The mobile access control backend 302E then forwards this information to the access control service 302C via the core service provider 302A. Additionally, the mobile access control backend 302E receives a user identifier from the access control UI 306A, where this user identifier may correspond to some data originating from the mobile device 306 or the identification of a registered user by the corresponding mobile service. The mobile access control backend 302E forwards this user identifier to the access control service 302C via the core service provider 302A.

The access control service 302C verifies the unique ID received from the mobile access control backend 302E relative to the corresponding unique ID received from the core service provider 302A. Additionally, the access control service 302C verifies the user identifier received from the mobile access control backend 302E relative to any corresponding user identifier received from the core service provider 302A. For example, the core service provider 302A may access account information from the module 302B that executes the provided service to verify a valid user. In some cases, the request from the client UI 304A includes a user name that can be verified against the user identifier received from the mobile access control backend 302E. In some cases, no additional verification of the received user identifier is required, for example, if there is no pre-existing account.

After the verification is complete, the access control service 302C sends an authorization to the core service provider 302A, which then requests initial content (e.g., an initial screen) from the provided service module 302B for the given authorization. Then, with initial content from the provided service module 302B, the core service provider 302A forwards the initial content to the UI Backend 302D, which generates an initial screen and forwards it to the client UI 304A.

Modular Apparatus Embodiment

Figure 4:
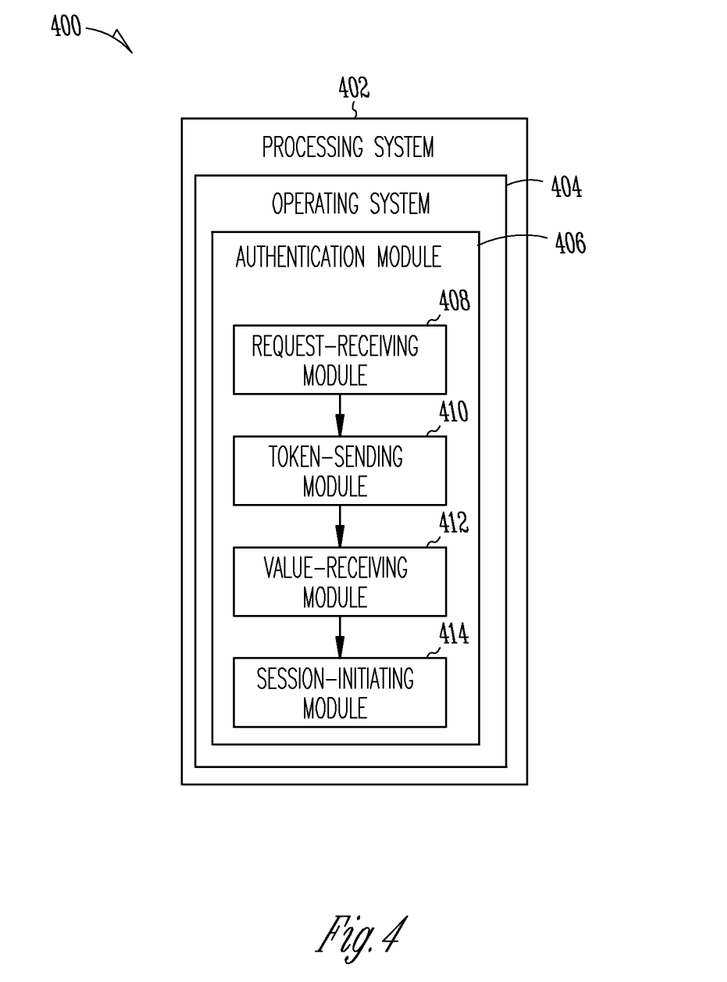
FIG. 4 is a schematic representation of an apparatus in accordance with an example embodiment.

FIG. 4 shows a schematic representation of an apparatus 400 in accordance with an example embodiment. For example, the apparatus 400 may be used to implement the method 100 of authenticating an application session at a client machine as described above. The apparatus 400 is shown to include a processing system 402 that may be implemented on a server, client, or other processing device that includes an operating system 404 for executing software instructions.

In accordance with an example embodiment, the apparatus 400 includes an authentication module 406 that includes a request-receiving module 408, a token-sending module 410, a value-receiving module 412, and a session-initiating module 414. The request-receiving module 408 operates to receive a request for the application session from the client machine. The token-sending module 410 operates to send an authentication token to the client machine after receiving the request from the client machine. The value-receiving module 412 operates to receive values for the authentication token and values for user identification from a mobile communication device after sending the authentication token to the client machine, where the user-ID values correspond to the mobile communication device. The session-initiating module 414 operates to initiate the application session at the client machine after receiving the authentication-token values and the user-ID values.

Example Machine Architecture and
Machine-Readable Medium

Figure 5:
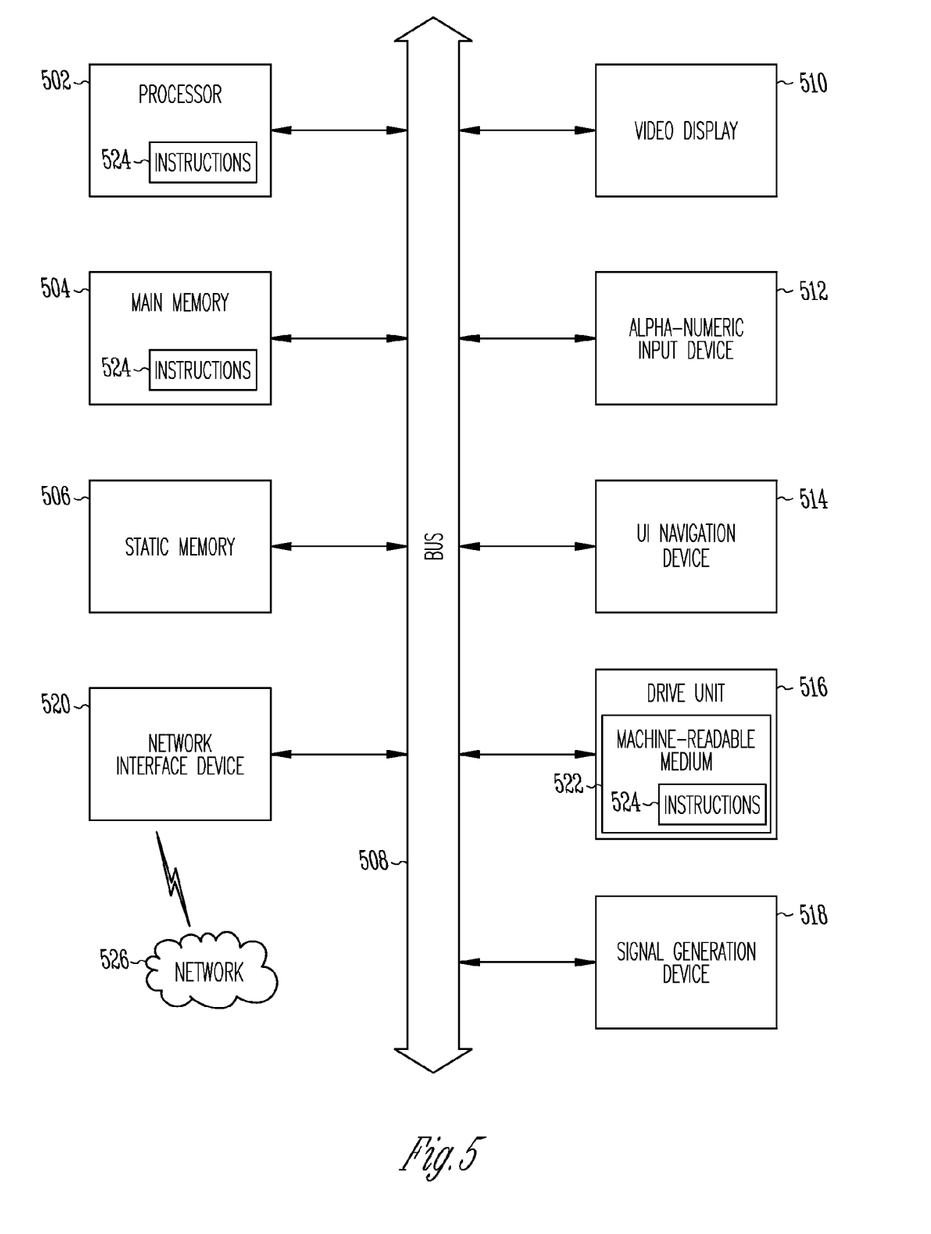
FIG. 5 is a block diagram of a computer processing system within which a set of instructions for causing the computer to perform any one of the methodologies discussed herein may be executed.

FIG. 5 is a block diagram of machine in the example form of a computer system 500 within which instructions, for causing the machine to perform any one or more of the methodologies discussed here, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 500 includes a processor 502 (e.g., a central processing unit (CPU), a graphics processing unit (GPU) or both), a main memory 504 and a static memory 506, which communicate with each other via a bus 508. The computer system 500 may further include a video display unit 510 (e.g., a liquid crystal display (LCD) or a cathode ray tube (CRT)). The computer system 500 also includes an alphanumeric input device 512 (e.g., a keyboard), a user interface (UI) navigation device 514 (e.g., a mouse), a disk drive unit 516, a signal generation device 518 (e.g., a speaker) and a network interface device 520.

In some contexts, a computer-readable medium may be described as a machine-readable medium. The disk drive unit 516 includes a machine-readable medium 522 on which is stored one or more sets of instructions and data structures (e.g., software) 524 embodying or utilized by any one or more of the methodologies or functions described herein. The instructions 524 may also reside, completely or at least partially, within the main memory 504 and/or within the processor 502 during execution thereof by the computer system 500, with the main memory 504 and the processor 502 also constituting machine-readable media.

While the machine-readable medium 522 is shown in an example embodiment to be a single medium, the term "machine-readable medium" may include a single medium or multiple media (e.g., a centralized or distributed database, and/or associated caches and servers) that store the one or more instructions or data structures. The term "machine-readable medium" shall also be taken to include any tangible medium that is capable of storing, encoding or carrying instructions for execution by the machine and that cause the machine to perform any one or more of the methodologies disclosed herein, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., Erasable Programmable Read-Only Memory (EPROM), Electrically Erasable Programmable Read-Only Memory (EEPROM), and flash memory devices; magnetic disks such as internal hard disks and removable disks; magneto-optical disks; Compact Disc Read-Only Memory (CD-ROM) and Digital Versatile Disc Read-Only Memory (DVD-ROM).

The instructions 524 may further be transmitted or received over a communications network 526 using a transmission medium. The instructions 524 may be transmitted using the network interface device 520 and any one of a number of well-known transfer protocols (e.g., HTTP). Examples of communication networks include a local area network (LAN), a wide area network (WAN), the Internet, mobile telephone networks, Plain Old Telephone (POTS) networks, and wireless data networks (e.g., WiFi and WiMax networks). The term "transmission medium" shall be taken to include any intangible medium that is capable of storing, encoding or carrying instructions for execution by the machine, and includes digital or analog communications signals or other intangible media to facilitate communication of such software.

Certain embodiments are described herein as including logic or a number of components, modules, or mechanisms. Modules may constitute either software modules or hardware-implemented modules. A hardware-implemented module is a tangible unit capable of performing certain operations and may be configured or arranged in a certain manner. In example embodiments, one or more computer systems (e.g., a standalone, client or server computer system) or one or more processors may be configured by software (e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor or other programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired) or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses) that connect the hardware-implemented modules. In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., Application Program Interfaces (APIs).)

CONCLUSION

Although only certain embodiments been described in detail above, those skilled in the art will readily appreciate that many modifications are possible without materially departing from the novel teachings of this disclosure. For example, aspects of embodiments disclosed above can be combined in other combinations to form additional embodiments. Accordingly, all such modifications are intended to be included within the scope of this disclosure.

What is claimed is:

1. A method of authenticating an application session at a client machine, the method comprising:
   receiving a request for the application session from the client machine;
   sending an authentication token to the client machine after receiving the request from the client machine;
   receiving values for the authentication token and values for user identification from a mobile communication device after sending the authentication token to the client machine;
   using the user-identification values to identify a registered user of the mobile communication device with a mobile service provider corresponding to the mobile communication device;
   verifying the authentication-token values relative to the authentication token;
   verifying the user-identification values by verifying that the registered user corresponds to at least one of the request or a user account of an application service corresponding to the application session, the registered user being identified by the user-identification values received from the mobile communication device, and the request for the application session being received from the client machine; and
   initiating the application session at the client machine after verifying the authentication-token values and the user-identification values.

2. The method of claim 1, wherein the request includes a user name and a password for a user account of the application service corresponding to the application session, and the verification of the user-identification values includes:
   verifying the user name for the user account by comparing the user name with the registered user of the mobile communication device; and
   verifying the password with the user name for the user account of the application service.

3. The method of claim 1, wherein the authentication token includes at least one of a text element, an audio file or an image file.

4. The method of claim 1, wherein the user-identification values are retrieved from a file that is stored at the mobile communication device prior to the request for the application session.

5. The method of claim 1, wherein the user-identification values include biometric data corresponding to an input mode of the mobile communication device.

6. The method of claim 1, wherein the authentication-token values represent the authentication token in a format corresponding to an input mode of the mobile communication device.

7. The method of claim 1, further comprising:
   identifying a user account of the application service from the user-identification values or from the request, wherein the application session is initiated at the client machine for the identified user account.

8. The method of claim 1, wherein the verification of the user-identification values includes:
   verifying the registered user of the communication device relative to a user name that is included in the request.

9. The method of claim 1, wherein the user-identification values include a mobile phone number of the mobile communication device.

10. The method of claim 1, wherein the verification of the user-identification values includes:
    identifying a user account of the application service corresponding to the application session, the identified user account being associated with the registered user of the mobile communication device, and the application session being initiated at the client machine for the identified user account.

11. A non-transitory computer-readable medium that stores a computer program for authenticating an application session at a client machine, wherein the computer program includes instructions that, when executed by a computer, cause the computer to perform operations comprising:
    receiving a request for the application session from the client machine;
    sending an authentication token to the client machine after receiving the request from the client machine;
    receiving values for the authentication token and values for user identification from a mobile communication device after sending the authentication token to the client machine;
    using the user-identification values to identify a registered user of the mobile communication device with a mobile service provider corresponding to the mobile communication device;
    verifying the authentication-token values relative to the authentication token;
    verifying the user-identification values by verifying that the registered user corresponds to at east one of the request or a user account of an application service corresponding to the application session, the registered user being identified by the user-identification values received from the mobile communication device, and the request for the application session being received from the client machine; and
    initiating the application session at the client machine after verifying the authentication-token values and the user-identification values.

12. The computer-readable medium of claim 11, wherein the request includes a user name and a password for a user account of the application service corresponding to the application session, and the verification of the user-identification values includes:
    verifying the user name for the user account by comparing the user name with the registered user of the mobile communication device; and
    verifying the password with the user name for the user account of the application service.

13. The computer-readable medium of claim 11, wherein the authentication token includes at least one of a text element, an audio file or an image file.

14. The computer-readable medium of claim 11, wherein the user-identification values are retrieved from a file that is stored at the mobile communication device prior to the request for the application session.

15. The computer-readable medium of claim 11, wherein the user-identification values include biometric data corresponding to an input mode of the mobile communication device.

16. The computer-readable medium of claim 11, wherein the authentication-token values represent the authentication token in a format corresponding to an input mode of the mobile communication device.

17. The computer-readable medium of claim 11, wherein the computer program further includes instructions that, when executed by the computer, cause the computer to perform operations comprising:

identifying a user account of the application service from the user-identification values or from the request, wherein the application session is initiated at the client machine for the identified user account.

18. An apparatus to authenticate an application session at a client machine, the apparatus comprising at least one computer configured to perform operations for computer-implemented modules including:

a request-receiving module to receive a request for the application session from the client machine;

a token-sending module to send an authentication token to the client machine after receiving the request from the client machine;

a value-receiving module to receive values for the authentication token and values for user identification from a mobile communication device after sending the authentication token to the client machine, the value-receiving module performing operations including:

using the user-identification values to identify registered user of the mobile communication device with a mobile service provider corresponding to the mobile communication device, verifying the authentication-token values relative to the authentication token, and verifying the user-identification values by verifying that the registered user corresponds to at least one of the request or a user account of an application service corresponding to the application session, the registered user being identified by the user-identification values received from the mobile communication device, and the request for the application session being received from the client machine; and a session-initiating module to initiate the application session at the client machine after verifying the authentication-token values and the user-identification values.

19. The apparatus of claim 18, wherein the session-initiating module performs operations including:

identifying a user account of the application service from the user-identification values or from the request, wherein the application session is initiated at the client machine for the identified user account.

* * * * *